United States Patent [19]

Koyama et al.

[11] 4,021,410

[45] May 3, 1977

[54] MELT-SPUN DRAWN OR UNDRAWN FLAME-RESISTANT AND ANTIFUSING CURED EPOXY-MODIFIED NOVOLAK FILAMENTS AND PROCESS FOR PRODUCTION THEREOF

[75] Inventors: Hiroaki Koyama, Osaka; Isao Kimura, Suita, both of Japan

[73] Assignee: Nippon Kynol Inc., Osaka, Japan

[22] Filed: Jan. 3, 1975

[21] Appl. No.: 538,435

Related U.S. Application Data

[63] Continuation of Ser. No. 303,873, Nov. 6, 1972, abandoned.

[30] Foreign Application Priority Data

Nov. 13, 1971 Japan .............................. 46-90981

[52] U.S. Cl. .......................... 260/59 EP; 260/59 R; 264/176 F; 264/236
[51] Int. Cl.$^2$ ..................... C08G 2/28; C08G 2/30; B29C 25/00
[58] Field of Search ...................... 260/59 EP, 59 R; 264/176 F, 236

[56] References Cited

UNITED STATES PATENTS

| | | | |
|---|---|---|---|
| 2,658,885 | 11/1953 | D'Alelio ........................ | 260/59 EP |
| 2,683,130 | 7/1954 | D'Alelio ........................ | 260/59 EP |
| 3,650,102 | 3/1972 | Economy et al. .................. | 260/59 |
| 3,716,521 | 2/1973 | Economy et al. .................. | 260/59 |
| 3,848,044 | 11/1974 | Hagiwara et al. .................. | 260/59 |

*Primary Examiner*—Howard E. Schain
*Attorney, Agent, or Firm*—Sherman & Shalloway

[57] ABSTRACT

A process for producing a flame-resistant and antifusing cured phenolic continuous filament, characterized by melt-spinning a molten resin of an uncured epoxy-modified novolak resin, and then curing the melt-spun filament obtained, and the filament produced by the aforesaid process.

8 Claims, No Drawings

MELT-SPUN DRAWN OR UNDRAWN FLAME-RESISTANT AND ANTIFUSING CURED EPOXY-MODIFIED NOVOLAK FILAMENTS AND PROCESS FOR PRODUCTION THEREOF

This is a continuation, of application Ser. No. 303,873, filed Nov. 6, 1972 now abandoned.

This invention relates to a process for producing drawn or undrawn flame-resistant and antifusing cured epoxy-modified novolak filaments having highly improved abrasion resistance, knot strength, and bending strength necessary for clothing filaments.

A melt-spun drawn or undrawn flame-resistant and antifusing cured phenolic filament obtained by melt-spinning a molten resin of an uncured novolak resin, and then curing the melt-spun filament with a curing agent for phenolic resins in the presence of an acid catalyst is known in the prior art (for example, South African Pat. No. 6,901,356).

However, such a process poses various problems. The novolak resins to be used in melt spinning generally have a low molecular weight. Therefore, the melt viscosity of the polymer depends considerably upon the temperature and it is very difficult to wind the melt-spun fine filaments continuously for a long time as in the usual synthetic fibers. Alternatively, the novolak resin is mixed and melted with another thermoplastic polymer such as a polyamide resin to improve its spinnability and form continuous filaments. Furthermore, when the novolak resin alone is melt spun and the resulting filaments are cross-linked and cured with formaldehyde as a curing agent, a considerably prolonged curing period, in some cases, ten or more hours are needed in order to obtain the fibers having physical properties durable to the weaving process. A cross-linking treatment for a short time cannot provide phenolic filaments having satisfactory strength and elongation. Even if phenolic filaments having the same strength and elongation as in conventional clothing fibers can be obtained, the fibers composed of a condensed product of phenol and formaldehyde are generally poor in flexibility, and their knot strength and bending strength are much lower than those of clothing fibers in widespread use, including natural fibers and synthetic fibers. In other words, the deficiency of abrasion resistance is the most important defect of the phenolic fibers in the weaving process or in end uses of articles made therefrom.

The solution of these problems must be achieved while maintaining the anti-fusing and flame-resistance properties of the phenolic fibers. For example, when the novolak resin is mixed and melted with an other thermoplastic polymer in order to increase the melt viscosity of the novolak resin and improve the spinnability thereof, the spinnability increases with the increasing ratio of the other polymer, and the continuous filaments can be wound. But the flame-resistance of the cross-linked and cured fibers decreases and the fibers gradually become flammable.

The present inventors made studies in order to achieve the maintenance of the flame-resistant and antifusing properties of the novolak filaments, the improvement of spinnability which is not usually compatible with these properties, and also the improvement of yarn properties such as knot strength and bending strength. Consequently, they found that an uncured epoxy-modified novolak resin preferably having a substitution degree of glycidyl etherification of from 5 to 60 % can provide filaments which possess all of these properties.

Accordingly, the objects of this invention are to provide flame-resistant and antifusing cured phenolic continuous filaments having all these advantages, and a method of producing these filaments.

Many other objects of the present invention along with its advantages will become clearer from the following description.

The epoxy-modified novolak resin itself used in the present invention is known. It can be prepared, for example, by reacting the novolak resin with epichlorohydrin in the presence of an alkaline catalyst. Previously, the epoxy-modified novolak resin has been used in the form of molded articles obtained by compression molding at low pressures for component parts of electric and electronic machinery and appliances, because of its useful electrical insulation properties. It has been totally unknown that by meltspinning this epoxy-modified novolak resin, there can be obtained filaments having advantageous properties which have hitherto been incompatible with one another in the conventional novolak filaments. It has even been unknown that useful filaments themselves can be obtained from such an epoxy-modified novolak resin.

The epoxy-modified novolak resin used in the present invention and a method of its preparation are known, and any detailed description of them will be omitted in this specification. Briefly stated, it can be obtained, for example, by reacting the novolak resin with an epihalohydrin such as epichlorohydrin in the presence of an inorganic alkaline catalyst such as an alkali hydroxide at a temperature of about 70° to 100° C.

The novolak resin used to form the epoxy-modified novolak resin is also well known, and can be produced by reacting (polycondensing) a phenol with an aldehyde under heat in the presence of an acid catalyst. Usually, novolak resins having a number average molecular weight of about 300 to about 5,000 preferably about 600 to about 1,500 may be used.

Therefore, as is well known, mainly novolak-type modified novolak resins obtained by any desired combination of the novolak-type reaction and the resol-type reaction can also be used. Furthermore, any desired combination of phenols and aldehydes can be used, and different novolak resins each derived from a different combination of phenol and aldehyde can be used conjointly.

The phenols used for producing the novolak resins are most commonly phenol and cresol. But other phenols can also be used. Examples of these phenols are phenol, o-cresol, m-cresol, p-cresol, 2,3-xylenol, 2,5-xylenol, 2,4-xylenol, 2,6-xylenol, 3,4-xylenol, 3,5-xylenol, o-ethylphenol, m-ethylphenol, p-ethylphenol, p-phenylphenyl, p-tertiary butyl phenol, p-tertiary amylphenol, bisphenol A, resorcinol, halogen substituted phenols and mixtures of two or more of these with each other.

The aldehyde most commonly used for polycondensation with the above phenol is formaldehyde, but paraformaldehyde, trioxane, tetraoxane, polyoxymethylene, benzaldehyde, hexamethylenetetramine, furfural and mixtures thereof can also be utilized. These aldehydes may be used as a curing agent in this invention.

The acid catalyst used for the reaction of forming novolak resins may be any known organic or inorganic acid, for example, hydrochloric acid, nitric acid, sulfuric acid, phosphoric acid, formic acid, acetic acid, oxalic acid, or phthalic acid.

The amount of the epihalohydrin used for the formation of the epoxy-modified novolak resin used in the present invention can be determined according to the desired substitution degree of glycidyl etherification of the phenolic hydroxy group in the novolak resin. If this substitution degree is more than 80 % of the theoretical value, the amount of the epihalohydrin is more than 3 times, usually 4 to 6 times, the phenol constituting the novolak in terms of moles.

When the amount of epihalohydrin used is less than such an amount, the substitution degree generally decreases. The amount of the inorganic alkali such as sodium hydroxide used may be equivalent to or somewhat in excess of either the epihalohydrin or the phenolic hydroxyl group, which is used in a smaller molar quantity.

When the amount of epihalohydrin used is smaller, the novolak is dissolved in an organic solvent such as dioxane. Thus, the epihalohydrin may be added thereto and the resulting mixture can be reacted in the presence of an alkali.

The reaction may be carried out at about 100° C. for 1 – 2 hours with stirring and after the reaction, an excess of the epihalohydrin, the formed water and the organic solvent are distilled off and then the by-product inorganic salt is removed to yield an epoxy-modified novolak resin.

The substitution degree of glycidyl etherification of the novolak to be used in the present invention, that is, the substitution degree with respect to the phenolic hydroxyl group of the resin is preferably 5 – 60 %, especially 10 – 40 %.

In this case, when the substitution degree is less than 5 %, the melt viscosity of the resin and the abrasion resistance of the cross-linked and cured filaments are not satisfactorily increased, while when it exceeds 60 %, the antifusing property and flame-resistance of the cross-linked and cured filaments do not appear distinctly.

Known treatments, such as filtration or deforming of the molten epoxy-modified novolak resin can be performed at any time before the molten resin reaches the spinneret. The spun filament can be cured after wind-up or at any time before wind-up. Th wind-up rate is usually about 200 to 2500 meters per minute. Usually, wind-up rates somewhat faster than the spinning speed give favorable effects to the tenacity of the resulting filament.

Known oils, or n-paraffinic hydrocarbons, etc. can be utilized as spinning oil preparations.

Thus, according to the preferred embodiment of this invention, there is provided a melt-spun drawn or undrawn flame-resistant and antifusing cured epoxy-modified phenolic continuous filament consisting essentially of a cured epoxy-modified novolak resin derived from an uncured epoxy-modified novolak resin having a substitution degree of glycidyl etherification of the resin from 5 to 60 %, preferably from 10 to 40 %.

The above described range of the substitution degree may be obtained by selecting the conditions under which the glycidyl etherification is performed using an epihalohydrin as described above. Alternatively the epoxy-modified novolak resin having a desirable average substitution degree may be obtained by mixing a given amount of unmodified novolak resin with the epoxy modified novolak resin having a high substitution degree.

The epoxy-modified novolak resin thus obtained, as in the melt spinning of the usual thermoplastic polymer, is melted under an inert gas atmosphere or under the back pressure thereof and extruded from a nozzle through a gear pump in fine flows. The resulting filaments can be wound up on a bobbin.

The melt-spun epoxy-modified novolak filaments may be cured with a curing agent for phenolic resins in the presence of an acid catalyst or basic catalyst, or may be cured with a curing agent for epoxy resins. For example, melt-spun epoxy-modified novolak filaments are cured with an aldehyde as a curing agent for phenolic resins selected from the group consisting of formaldehyde, paraformaldehyde, trioxane, tetraoxane, polyoxymethylene, benzaldehyde, hexamethylenetetramine, furfural and mixtures thereof, or in the presence of an acid catalyst or basic catalyst selected from the group consisting of hydrochloric acid, sulfuric acid, nitric acid, acetic acid, oxalic acid, formic acid, orthophosphoric acid, butyric acid, lactic acid, benzenesulfonic acid, p-toluenesulfonic acid, boric acid, mixtures of the above acids, ammonia, ammonium hydroxide, hydroxides of alkali metals, hydroxides of alkaline earth metals, carbonates of alkali metals, carbonates of alkaline earth metals and mixtures of the above bases. Alternatively, the melt-spun epoxy-modified novolak filaments are cured with a curing agent for epoxy resins selected from the group consisting of ethanolamine, triethylenetetramine, diaminodiphenylmethane, m-phenylenediamine, trifluoroboron-mono-ethylamine, diaminodiphenylsulfone, phthalic anhydride, hexahydrophthalic anhydride, heptoic acid, phenol and tris-(dimethylamino-ethyl) phenol.

A combination of the above described two types of curing processes may also be used.

In the most general embodiment of the curing process of epoxy-modified novolak filaments with the aldehyde in the presence of the acid catalyst or basic catalyst, the meltspun filament is immersed in, or caused to run through, a bath containing the curing agent and the acid or basic catalyst described above and held at room temperature or temperatures near room temperature, for example, 5° to 45° C., preferably 10° to 40° C. It is then heat-cured at a temperature of 60° to 140° C., preferably 70° to 130° C. The contacting between the filament and a liquid containing the curing agent is not limited to the method described, but other means such as spraying or fuming can also be utilized.

One example of the liquid containing the curing agent is a 5 – 40 %, preferably 15 – 30 %, aqueous solutions of formaldehyde whose pH has been adjusted to 8 – 13, preferably 8.5 – 11, by addition of the basic catalyst.

Another example of the aqueous liquid of the bath is a liquid containing the curing agent such as formaldehyde in an amount of from 12 to 22 % by weight, preferably from 16 to 19 % by weight, and the acid catalyst in an amount of from 12 to 20 % by weight, preferably from 16 to 18 % by weight.

Preferably, after contacting the melt-spun filament with the curing agent for phenolic resins, the temperature is raised gradually to the heat-curing range. For example, the temperature is raised to the desired point at a rate of about 3 to 20° C./hour from the initiation of heat-curing. Alternatively, the temperature is maintained as low as possible at the initial stage of heat-curing, and substantial raising of the temperature is performed from the intermediate stage of heat-curing until the final desired temperature is obtained. As another alternative, substantial temperature raising is performed from the initial stage of heat-curing, but the final temperature is held at as low a temperature as possible and this state is maintained. After the curing operation, the filament is washed with water, neutralized with alkali if necessary, and dried to obtain a final filament product.

In another embodiment of the curing process of epoxy-modified novolak filaments with the aldehyde as curing agent in the presence of the acid catalyst or basic catalyst, the melt-spun filaments are pre-cured or partially cured first in the presence of an acid catalyst, and then the pre-cured filaments are cured in the presence of the basic catalyst.

In an embodiment of the curing process of epoxy-modified novolak filament with a curing agent for epoxy resins, the melt-spun filament is immersed in, or caused to run through, a bath containing the curing agent and held at room temperature or temperatures near room temperature, for example 10° to 40° C., preferably 20° to 30° C. It is then heat-cured at a temperature of 60° to 120° C., preferably 80° to 100° C. The contacting between the melt-spun filament and a liquid containing the curing agent for epoxy resins may be also carried out by means of spraying or fuming. The liquid containing the curing agent may have a concentration of 5 – 50 %, preferably 10 – 40 %.

The melt-spun filament of this invention can be drawm at any desired time before and/or after curing. The drawing often results in desirable properties of the filament.

The drawing operation may be conducted in one stage or more, and the filament can be either cold or hot drawn. In the case of a multi-stage drawing, cold drawing and hot drawing can be optionally combined. The draw ratio is also optional, and usually can be up to 2.5 based on the length of the undrawn filament.

According to this invention, it has been found that when the melt-spun epoxy-modified novolak filaments are treated with a curing agent such as an aqueous solution of formaldehyde-hydrochloric acid (which is a conventional process for curing nvolaks, or when the epoxy modified novolak filaments, after such curing treatment, are immersed in an aqueous solution of formaldehyde-ammonia followed by raising the temperature gradually, or are exposed to a vapor of said curing agent, the epoxy-modified novolak filaments, preferably, have the above defined substitution degree from a cross-linking between the epoxy group and phenolic hydroxyl group in addition to the conventional methylene cross-linkage between phenolic aromatic rings. It is to be particularly emphasized that the epoxy groups existing in the filaments cause a cross-linking reaction with the phenolic hydroxyl groups of the unmodified novolak component in the vicinity of the epoxy groups. The cured filaments retain flexibility and again the infusible property and the flame resistance. This is a noticeable characteristic in the method of the present invention.

The resulting continuous filament of this invention can be directly used in the form of monofilaments, multifilaments, or tows, but can also be used in the form of fibers cut to the desired lengths. Alternatively, it can be used as spun yarn either alone or in admixture with known filaments or fibers, or in the form of twisted yarns or the like. It can also be made into various filamentary structures such as knitted or woven fabrics or non-woven fabrics either alone or in admixture with known filaments. Accordingly, the present invention includes within its scope a filamentary structure in a form selected from the group consisting of fibers, yarns, knitted fabrics, woven fabrics, non-woven fabrics, felt or carpets or the like, which contains or consists of a filamentary material derived from the melt-spun drawn or undrawn flame-resistant and antifusing cured epoxy-modified phenolic continuous filament.

Because of the methylene cross-linkage and the cross-linkage between the epoxy group and the phenolic hydroxyl group, the resulting cured fibers have a high flexibility which has never been observed in the conventional phenolic fibers, maintain the inherent antifusing property and flame-resistance, and have sufficient tensile strength and elongation required for clothing fibers, as well as highly improved abrasion resistance in view of the knot strength and bending strength.

The following examples are given to illustrate this invention and are not intended as limitations thereof.

Example 1

A 1.0 l separable flask equipped with a reflux condenser and a stirrer was charged with 570 g (1.0 mole) of novolak having an average molecular weight of 570, which was obtained by polycondensing p-cresol with formalin, 48 g (1.2 moles) of sodium hydroxide and 432 g of water. Then 97.1 g (1.05 moles) of epichlorohydrin was added thereto while heating and stirring at 70° C. The temperature was raised to 97° – 99° C. in the course of 15 minutes and the heating and stirring were continued at this temperature for 90 minutes. After the reaction, the reaction mixture was thoroughly washed with hot water at 60° C. and heated under reduced pressure, finally 10 mmHg at 160° C. to remove water and low boiling substances.

The novolak type epoxy resin obtained had an average molecular weight of 650 and a melting point of 135° – 140° C.

The novolak type epoxy resin was then melted at 160° C., defoamed, and then extruded at a melting temperature of 145° C. through a spinneret provided with four orifices, each having a diameter of 2.0 mm. The resulting filaments were then wound on a bobbin at a take-up velocity of 800 m/min.

The filaments thus obtained were immersed in a mixed solution of 500 ml of ethanol and 500 ml of dimethylformamide for 16 hours, and thereafter the temperature was gradually raised to 90° C. over a period of 3 hours and further maintained at 90° to 95° C. for 60 minutes. Then, after washing with water, the filaments were dried at 80° C. for 30 minutes.

For comparison, a novolak resin having an average molecular weight of 620, which was obtained by polycondensing phenol with formalin in the presence of a sulfuric acid catalyst, was melted at 160° C. defoamed and then extruded at a melting temperature of 135° C. through a spinneret provided with four orifices, each having a diameter of 2.0 mm. The resulting filaments were then wound on a bobbin at a take-up velocity of 800 m/mm.

The phenol filaments thus obtained were immersed in a mixed solution comprising 500 ml of 35 % by weight of hydrochloric acid and 500 ml of 37 % by weight of formalin, and thereafter the temperature was gradually raised to 90° C. over a period of 6 hours and further maintained at 90° to 95° C. for 60 minutes. Then, the filaments were immersed in an aqueous solution of 1.5 % by weight of ammonia at 70° C. for 5 hours, washed with water and then dried at 80° C. for 30 minutes.

The diameter, strength, elongation and Young's modulus were measured with respect to the epoxy phenol filaments according to the present invention and phenol filaments as a control. The results obtained are shown in Table 1.

Table 1

|  | Filament diameter ($\mu$) | Strength (kg/cm$^2$) | Elongation % | Young's modules (kg/cm$^2$) | Knot strength (kg/cm$^2$) | Pending* strength (number of bending cycles at breakage) |
|---|---|---|---|---|---|---|
| Present invention | 17.2 | 1,530 | 36.5 | 41,000 | 1,480 | 4,500 |
| Control | 16.9 | 1,620 | 7.6 | 96,000 | 600 | 700 |

Note)
*: The load is 0.5 g/d.

As seen from the above Table 1, the epoxy filaments according to the present invention have a higher elongation and smaller Young's modulus than the phenol control filaments and have a very flexible texture.

EXAMPLE 2

The novolak type epoxy filaments obtained by the method of Example 1 were immersed in a mixed solution of 80 g of phenol, 4.6 g of potassium hydroxide and 316.4 g of water at room temperature for 5 hours, and thereafter the temperature was raised from room temperature to 100° C. over a period of 5 hours and further maintained at this temperature for 2 hours. The treated filaments were washed with water and dried at 80° C. for 1 hour. Substantially white filaments were obtained. These filaments were infusible and flame resistant and had a strength of 1,760 kg/cm$^2$, an elongation of 28.3 % and a Young's modulus of 51,000 kg/cm$^2$.

EXAMPLE 3

A 1.0 l separable flask equipped with a reflux condenser and a stirrer was charged with 564 g (0.6 mole) of novolak having an average molecular weight of 940, which was obtained by polycondensing phenol with formalin in the presence of a hydrochloric acid catalyst, 39.2 g (0.7 mole) of potassium hydroxide and 360 g of water, and then 73.2 g (0.8 mole) of epichlorohydrin was added thereto while heating at 80° C. and stirring. The resulting mixture was heated and stirred at this temperature for 60 minutes and then at 110° C. for 30 minutes. After the reaction, the reaction mixture was cooled to 50° C. and 73 g of 35 % by weight of hydrochloric acid was added thereto. Then, the resulting mixture was stirred for 10 minutes and washed 5 times with hot water at 80° C. Next, the resulting resin was gradually heated to 180° C. at a reduced pressure of 8 mmHg.

The novolak type epoxy resin thus obtained had an average molecular weight of 1,010.

The novolak type epoxy resin obtained was melted at 165° C. and extruded through a spinneret provided with six orifices, each having a diameter of 1.5 mm, and the resulting filaments were wound on a bobbin at a take-up velocity of 600 m/mm.

The filaments obtained were immersed in a mixed solution comprising 500 ml of 35 % by weight of a hydrochloric acid, 500 ml of 37 % by weight of formalin and 50 g of tris-(dimethylaminomethyl) phenol at room temperature for 10 hours and then the temperature was gradually raised to 100° C. over a period of 6 hours. After washing with water and drying, the treated filament had a strength of 890 kg/cm$^2$, an elongation of 17.6 % and a Young's modulus of 83,000 kg/cm$^2$.

The filaments were immersed in the mixed solution of hydrochloric acid, formalin and tris-(dimethylaminomethyl) phenol at 100° C. for 3 hours, neutralized with an aqueous solution of 1.5 % by weight of ammonia, washed with water and dried. The treated filaments were light yellow, infusible and flame resistant and had a strength of 1,830 kg/cm$^2$, an elongation of 31.5 % and a Young's modulus of 51,000 kg/cm$^2$.

EXAMPLE 4

Into a 1.0 l separable flask equipped with a reflux condenser and a stirrer were added 228 g (1 mole) of bisphenol-A and 55.8 g (1.37 moles) of sodium hydroxide as a 10 % by weight aqueous solution. The resulting mixture was then heated at 60° C. and stirred. 100.7 g (1.1 moles) of epichlorohydrin was added thereto and then the temperature was raised to 100° C. The reaction was further carried out at this temperature for 90 minutes.

After the reaction, the reaction mixture was cooled to 40° C. and neutralized while gradually adding 286 g of 17.5 % by weight of hydrochloric acid, and washed 3 times with hot water.

The resulting mixture was gradually heated to 160° C. under a reduced pressure of 8 mmHg to obtain an epoxy resin having a melting point of 126° C. and an average molecular weight of 1,800.

The epoxy resin obtained was melt-extruded at a melting temperature of 130° C. through a spinneret provided with four orifices, each having a diameter of 2.0 mm and the resulting filaments were wound on a bobbin at a take-up velocity of 800 m/min.

The filament obtained had a fineness of 17.3 $\mu$, a strength of 190 kg/cm$^2$, an elongation of 0.89 % and a Young's modulus of 12,300 kg/cm$^2$.

The filaments were immersed in a 5 % by weight aqueous solution of triethylenetetramine at room temperature for 8 hours, and thereafter the temperature was gradually raised to 80° C. and further this temperature was maintained for 30 minutes. Then, the filaments were washed with water and dried at 80° C. for 30 minutes.

The filaments thus obtained had a strength of 1,570 kg/cm$^2$, an elongation of 26.3 % and a Young's modulus of 63,000 kg/cm$^2$.

EXAMPLE 5

100 g of the novolak type epoxy resin obtained in Example 3 and 100 g of the bisphenol-A type epoxy resin obtained in Example 4 were mixed in a powdery form, and the resulting mixture was melted at 165° C. and extruded at 145° C. through a spinneret provided with four orifices, each having a diameter of 0.15 mm, and then the resulting filaments were wound on a bobbin at a take-up velocity of 700 m/min.

The filaments thus obtained were immersed in a mixed solution of 180 g of phthalic anhydride and 420 g of dimethylacetamide for 16 hours, and thereafter the temperature was raised to 120° C. over a period of 4 hours and this temperature was maintained for an additional 2 hours. The treated filaments were washed with water, treated with a 2.0 % by weight aqueous solution of ammonia at 60° C. for 10 minutes, washed with water and dried.

The filaments obtained were colorless, infusible and flame resistant.

EXAMPLE 6

100 g of novolak having a softening point of 135° to 140° C. and an average molecular weight of 720, which was obtained by polycondensing phenol with formalin in the presence of a hydrochloric acid catalyst, and 100 g of the bisphenol-A type epoxy resin obtained in Example 4 were mixed and melted at 160° C. and then extruded at a melting temperature of 130° C. through a spinneret provided with four orifices, each having a diameter of 2.0 mm. The resulting filaments were then wound on a bobbin at a take-up velocity of 600 m/min.

The filaments thus obtained were immersed in a mixed solution comprising 600 ml of 35 % by weight hydrochloric acid and 400 ml of 37 % by weight formalin at room temperature for 5 hours and then heated to 80° C. in the course of 2 hours.

The treated filaments were washed with water, immersed in a 10 % by weight aqueous solution of triethylenetetramine at room temperature for 1 hour and then heated to 100° C. for 1 hour. The resulting filaments had a strength of 1,250 kg/cm$^2$, an elongation of 13.6 % and a Young's modulus of 113,000 kg/cm$^2$.

The filaments obtained were further boiled in the mixed solution of hydrochloric acid and formalin at 100° C. for 5 hours, washed with water, and immersed in a 3 % by weight aqueous solution of ammonia at 70° C. for 10 minutes. The treated filaments had a strength of 2,150 kg/cm$^2$, an elongation of 19.5 % and a Young's modulus of 65,000 kg/cm$^2$ and were infusible and flame resistant.

We claim:

1. A process for producing a flame-resistant and antifusing cured, epoxidized, phenol-aldehyde continuous filament comprising:
    A. melting an uncured resin consisting of an epoxidized phenol-aldehyde novolak resin having no substituents other than a 5 to 60% substitution degree of glycidyl etherification of the phenolic hydroxyl group; then
    B. forming a filament from the uncured molten resin by melt-spinning; and then
    C. curing the melt-spun filament by
        1. contacting the melt-spun filament with a curing agent selected from at least one of the group consisting of
            a. a curing agent for phenolic resins in combination with an acid or base catalyst, the curing agent being an aldehyde selected from at least one of the group consisting of: formaldehyde, paraformaldehyde, trioxane, tetraoxane, polyoxymethylene, benzaldehyde, hexamethylene tetramine, and furfuraldehyde; and the catalyst being selected from one of the group consisting of: acid catalysts consisting of hydrochloric, sulfuric, nitric, acetic, oxalic, formic, orthophosphoric, butyric, lactic, benzenesulfonic, p-toluenesulfonic, and boric acids, and mixtures thereof; and basic catalysts consisting of ammonia, ammonium hydroxide, alkali metal hydroxides, alkaline earth metal hydroxides, alkali metal carbonates, alkaline earth metal carbonates, and mixtures thereof;
            b. a curing agent for epoxy resins, which is selected from the group consisting of ethanolamine, triethylenetetramine, diaminodiphenylmethane, m-phenylenediamine, trifluoroboronmono-ethylamine, diaminodiphenylsulfone, phthalic anhydride, hexahydrophthalic anhydride, heptoic acid, phenol, and tris-(dimethylaminoethyl)phenol, and
        2. heating the melt-spun filament to a temperature of at least 60° C., with the proviso that the upper temperature of heating step (2) is about 140° C. if the curing agent (a) is used and is about 120° C. if curing agent (b) or a combination of curing agents (a) and (b) is used.

2. The process of claim 1, in which the substitution degree of glycidyl etherification of the phenolic hydroxyl group is from 10 to 40%.

3. The process of claim 1, in which the heating temperature is from 70° to 130° C. where curing agent (a) is used and is from 80° to 100° C. where curing agent (b) or a combination of curing agents (a) and (b) is used.

4. The process of claim 1, in which curing agent (a) is at least one aldehyde selected from the group consisting of formaldehyde, paraformaldehyde, trioxane, and tetraoxane and curing agent (b) is selected from the group consisting of ethanolamine, triethylenetetramine and tris-(dimethylaminoethyl)phenol.

5. The process of claim 1, in which the melt-spun filament is contacted at room temperature with a mixture of curing agent (a) which consists essentially of formaldehyde, with hydrochloric acid as the catalyst, and curing agent (b) which consists essentially of tris-(dimethylaminomethyl)phenol; heated to a temperature of 100° C.; and further contacted with a mixture of curing agent (a), which consists essentially of formaldehyde, with hydrochloric acid as the catalyst, and curing agent (b) which consists essentially of tris-(dimethylaminomethyl)phenol, the mixture being at a temperature of 100° C.

6. The process of claim 1, in which the melt-spun filament is contacted at room temperature with curing agent (a) which consists essentially of formaldehyde, with hydrochloric acid as the catalyst; heated to 80° C.; further contacted with curing agent (b) which consists essentially of triethylene tetramine at room temperature; and then heated to 100° C.

7. The process of claim 6, in which the melt-spun filament is further contacted with curing agent (a) which consists essentially of formaldehyde, with hydrochloric acid as the catalyst, at a temperature of 100° C.

8. Melt-spun drawn or undrawn flame-resistant and antifusing cured epoxy-modified continuous filaments, consisting essentially of the reaction product of uncured epoxidized phenolaldehyde novolak resin melt-spun filaments having no substituents other than a 10 to 40% substitution degree of glycidyl etherification of the phenolic hydroxyl group with a curing agent selected from at least one of the group consisting of
  a. a curing agent for phenolic resins in combination with an acid or base catalyst, the curing agent being an aldehyde selected from at least one of the group consisting of: formaldehyde, paraformaldehyde, trioxane, tetraoxane, polyoxymethylene, benzaldehyde, hexamethylene tetramine, and furfuraldehyde; and the catalyst is selected from one of the group consisting of: acid catalysts consisting of hydrochloric, sulfuric, nitric, acetic, oxalic, formic, orthophosphoric, butyric, lactic, benzenesulfonic, p-toluenesulfonic, and boric acids, and mixtures thereof; and basic catalysts consisting of ammonia, ammonium hydroxide, alkali metal hydroxides, alkaline earth metal hydroxides, alkali metal carbonates, alkaline earth metal carbonates, and mixtures thereof; and
  b. a curing agent for epoxy resins, which is selected from the group consisting of ethanolamine, triethylenetetramine, diaminodiphenylmethane, m-phenylenediamine, trifluoroboron-mono-ethylamine, diaminodiphenylsulfone, phthalic anhydride, hexahydrophthalic anhydride, heptoic acid, phenol, and tris-(dimethylamino-ethyl)phenol.

* * * * *